(12) United States Patent
Nakatsuji

(10) Patent No.: US 8,030,893 B2
(45) Date of Patent: Oct. 4, 2011

(54) BATTERY PACK AND METHOD FOR DETECTING DISCONNECTION OF SAME

(75) Inventor: Toshiyuki Nakatsuji, Hyogo (JP)

(73) Assignee: Panasonic Corporation, Osaka (JP)

( * ) Notice: Subject to any disclaimer, the term of this patent is extended or adjusted under 35 U.S.C. 154(b) by 381 days.

(21) Appl. No.: 12/296,759

(22) PCT Filed: Apr. 5, 2007

(86) PCT No.: PCT/JP2007/057654
§ 371 (c)(1),
(2), (4) Date: Oct. 10, 2008

(87) PCT Pub. No.: WO2007/119682
PCT Pub. Date: Oct. 25, 2007

(65) Prior Publication Data
US 2009/0051324 A1 Feb. 26, 2009

(30) Foreign Application Priority Data
Apr. 13, 2006 (JP) ................................. 2006-110434

(51) Int. Cl.
H02J 7/00 (2006.01)
(52) U.S. Cl. .......................... 320/116; 320/122; 320/134
(58) Field of Classification Search .................. 320/116, 320/122, 134
See application file for complete search history.

(56) References Cited

U.S. PATENT DOCUMENTS

| | | | | |
|---|---|---|---|---|
| 5,705,914 A | * | 1/1998 | Morita | ...................... 340/636.17 |
| 6,104,164 A | * | 8/2000 | Iino et al. | ...................... 320/116 |
| 6,977,483 B2 | | 12/2005 | Iwashima | |
| 2004/0036446 A1 | * | 2/2004 | Iwashima | ...................... 320/116 |
| 2006/0139008 A1 | * | 6/2006 | Park | .............................. 320/134 |

FOREIGN PATENT DOCUMENTS

| | | |
|---|---|---|
| JP | 10-150721 | 6/1998 |
| JP | 2004-104989 | 4/2004 |
| JP | 2004-170335 | 6/2004 |
| JP | 2004-180395 | 6/2004 |
| JP | 3603901 B2 | 12/2004 |
| JP | 2005-168118 | 6/2005 |

* cited by examiner

Primary Examiner — M'Baye Diao
(74) Attorney, Agent, or Firm — McDermott Will & Emery LLP

(57) ABSTRACT

The battery pack includes an assembled battery including a plurality of secondary battery cells connected at least in series; a voltage detector which detects a terminal voltage of each of the plurality of secondary battery cells; a charge/discharge controller which controls charge/discharge of the assembled battery based on the terminal voltage of each cell detected by the voltage detector; a short-circuiting section which short-circuits a node between cells to the high voltage side or the low voltage side of a power line, or which short-circuits nodes between the cells to each other; and a disconnection detector which controls conduction/non-conduction of the short-circuiting section and which detects a disconnection of the connection line from the voltage detector to the node between the cells, based on a state of controlling the conduction/non-conduction, and at least one of a voltage at the node between the cells detected by the voltage detector, a voltage of the high voltage side or the low voltage side of the power line, and a terminal voltage of each cell. The floating (disconnection) of intermediate taps of the secondary battery cells can be reliably detected without causing losses in regular processes.

6 Claims, 11 Drawing Sheets

BATTERY PACK AND METHOD FOR DETECTING DISCONNECTION OF SAME

RELATED APPLICATIONS

This application is the U.S. National Phase under 35 U.S.C. §371 of International Application No. PCT/JP2007/057654, filed on Apr. 5, 2007, which in turn claims the benefit of Japanese Application No. 2006-110434, filed on Apr. 13, 2006 the disclosures of which Applications are incorporated by reference herein.

TECHNICAL FIELD

The present invention relates to a battery pack and a method for detecting a disconnection in battery pack and, more particularly relates to a battery pack including an assembled battery having a plurality of secondary battery cells connected at least in series and a detection method suitably used to detect a disconnection of a connection line to a node between cells, i.e. a floating of an intermediate tap.

BACKGROUND ART

A typical conventional technology capable of detecting the floating of an intermediate tap is disclosed, for example, in patent document 1. According to this conventional technology, a protection circuit for a secondary battery is proposed in which a connection line from the intermediate tap to voltage detection means is connected with a power line via a pull-up resistor or a pull-down resistor and, when the intermediate tap is disconnected, the voltage on the connection line increases to a charge prohibiting voltage, thereby preventing an occurrence of an overvoltage and an overcharge.

However, the above conventional technology has a problem that loss occurs in a steady state due to the pull-up resistor or pull-down resistor. Accordingly, the resistance value of the pull-up resistor or the pull-down resistor needs to be increased to reduce the loss.

On the other hand, the battery pack often includes, in addition to the voltage detection means, a double protection IC or the like for detecting terminal voltages of the respective cells, detecting an abnormality based on a threshold value equal to or higher than that of charge and discharge controller and performing a protection operation. If the double protection IC is provided, charge terminals of the battery pack are connected via uniform internal resistors in the double protection IC. Thus, cell voltages to be measured are divided into voltages equally constituting the total voltage between the charge terminals, which leads to a problem of being unable to detect an actual overcharge state. Specifically, in the case where some of the cells are in an overcharge state (state where abnormality is originally supposed to be detected by the double protection IC) due to a cell balance disorder even if the total voltage is not abnormal in the actual battery, the total voltage is made uniform by voltage dividing resistors in the double protection IC if the intermediate tap is floating. Thus, neither an overcharge detection by the voltage detection means and the charge and discharge controller nor an overcharge detection by the double protection IC functions, wherefore charge is continued even in the overcharge state.

Accordingly, if another circuit such as the double protection IC is provided in parallel with the voltage detection means, it becomes even more difficult to detect the disconnection of the connection lines to the terminals of the respective cells due to the input resistance and capacitance of the other circuit, the internal voltage dividing resistors thereof and the like. Particularly, if the resistance value of the pull-up resistor or the pull-down resistor is increased to reduce the loss as described above, a voltage inputted to the voltage detection means upon the disconnection of the intermediate tap does not largely vary, making detection difficult.

Patent Document 1:
   Japanese Unexamined Patent Publication No. H10-150721

DISCLOSURE OF THE INVENTION

An object of the present invention is to provide a battery pack and a method for detecting a disconnection in a battery pack, which permits a charging operation to be terminated before an overcharging occurs with low loss in an event of an abnormality by detecting a disconnection in a liable manner.

A battery pack in accordance with one aspect of the battery pack of the present invention includes: an assembled battery including a plurality of secondary battery cells connected at least in series; a voltage detector which detects a terminal voltage of each of the plurality of secondary battery cells; a charge/discharge controller which controls charge/discharge of the assembled battery based on the terminal voltage of each cell detected by the voltage detector; a short-circuiting section which short-circuits a node between cells to the high voltage side or the low voltage side of a power line, or which short-circuits nodes between the cells to each other; and a disconnection detector which controls conduction/non-conduction of the short-circuiting section and which detects a disconnection of the connection line from the voltage detector to the node between the cells, based on a state of controlling the conduction/non-conduction, and at least one of a voltage at the node between the cells detected by the voltage detector, a voltage of the high voltage side or the low voltage side of the power line, and a terminal voltage of each cell.

The above battery pack includes the assembled battery including the plurality of secondary battery cells connected at least in series (a plurality of cells may be suitably connected also in parallel if necessary), the voltage detector and the charge and discharge controller, and the charge and discharge controller controls the charge and discharge to prevent an occurrence of an overvoltage or an overcharge of a specific cell, for example, due to a shift in cell balance in the charging processes based on the terminal voltages of the respective cells detected by the voltage detector. In this battery pack, the short-circuiting section for short-circuiting the nodes between the cells, i.e. intermediate taps to the high or low voltage sides of the power lines or short-circuiting the nodes to each other includes the disconnection detector for performing the ON/OFF control of the short-circuiting section and detecting the disconnection of the connection line from the voltage detector to the node between the cells based on the state of the ON/OFF control and at least one of the voltage at the node between the cells detected by the voltage detector, the voltage on the power line and the terminal voltages of the respective cells.

Accordingly, the disconnection of the connection line can be detected in a reliable manner from a deviation between a voltage expected from at least one of the voltage at the node, the voltage on the power line and the terminal voltages of the respective cells and a voltage actually detected by the voltage detector through the selective driving of the short-circuiting section by the disconnection detector, although it is difficult to detect the disconnection of the connection line to the node only from the terminal voltages of the respective cells, for example, because of the input resistance and capacitance of a circuit connected to the terminals of the respective cells. Therefore, in an event of an abnormality, the charging operation can be terminated before a problem of overcharge arises. Since the short-circuiting section is driven upon detecting disconnection, no loss occurs in regular processes, wherefore loss can be reduced.

BEST MODES FOR EMBODYING THE INVENTION

Figure 1:
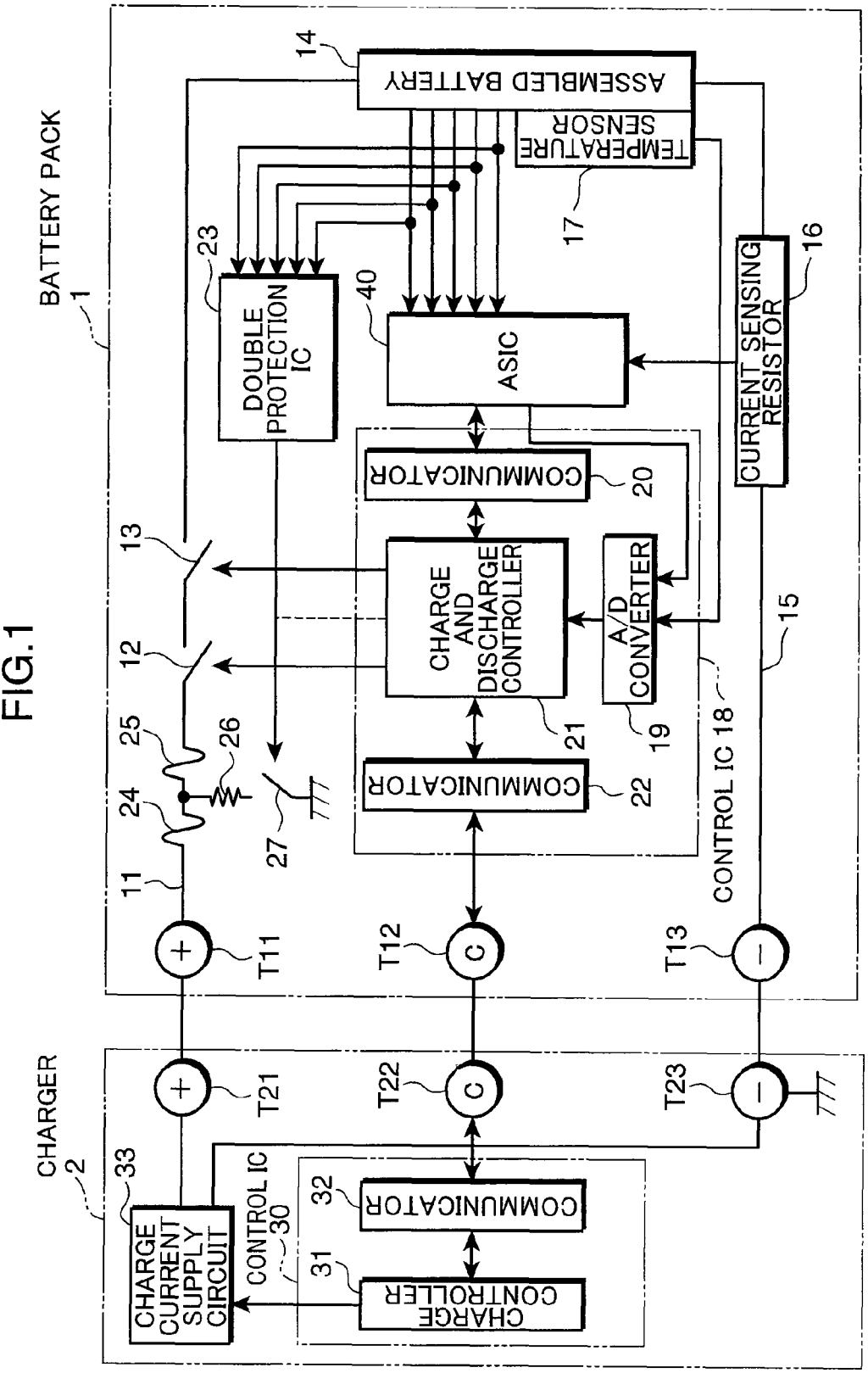
FIG. 1 is a block diagram showing the electrical structure of a charging system employing a disconnection detection method according to a first embodiment of the invention.

Hereinafter, embodiments of the present invention are described with reference to the accompanying drawings. In the following description, elements having the same structures/functions are designated by the same or similar reference numerals and are not repeatedly described in some cases.

First Embodiment

FIG. 1 is a block diagram showing the electrical structure of a charging system employing a disconnection detecting method according to the first embodiment of the present invention. As shown in FIG. 1, the charging system includes a battery pack 1 and a charger 2 for charging the battery pack 1. The charging system of the present invention is not limited to the foregoing structure, and may further include a load equipment (not shown), to which power is supplied from the battery pack 1. In the case of the charging system of FIG. 1, the battery pack 1 is charged by the charger 2; however, in the case of the above example of the charging system provided with the load equipment, the battery pack 1 may be mounted on the load equipment to be charged via the load equipment. The battery pack 1 and the charger 2 are interconnected by high voltage direct current terminals T11, T21 for power supply, terminals T12, T22 for communication signals, and GND terminals T13, T23 for power supply and communication signals. For the charging system provided with the load equipment, terminals are provided in the same manner as the case of FIG. 1.

In the battery pack 1, fuses 24, 25 and FETs 12, 13 having different conduction modes for charging/discharging are provided in a high voltage direct current charge path (power line) 11 extending from the above terminal T11, and the charge path 11 is connected to a high voltage terminal of an assembled battery 14. A low voltage terminal of the assembled battery 14 is connected to the GND terminal T13 via a low voltage direct current charge path 15, and a current sensing resistor 16 as a current detector for converting a charge current and a discharge current into current values is provided in this charge path 15.

The assembled battery 14 is made up of a plurality of secondary battery cells connected at least in series and, when necessary, the plurality of cells may be suitably connected also in parallel. The temperatures of the cells are detected by a temperature sensor 17 and inputted to an analog/digital converter 19 in a control IC 18.

A terminal voltage of each cell is selectively read by an ASIC (Application Specific Integrated Circuit) 40 as will be described later and is inputted to the analog/digital converter 19 in the control IC 18. The cell selection is performed by a charge and discharge controller 21 as charge and discharge control means via a communicator 20. A current value detected by the current sensing resistor 16 is also read by the ASIC 40 and is inputted to the analog/digital converter 19 in the control IC 18. Although the ASIC 40 for reading a terminal voltage of each cell and the analog/digital converter 19 for measuring a terminal voltage of each cell are separated from each other in FIG. 1, the present embodiment is not intended to be limited to the foregoing structure, and for example, such structure wherein the analog/digital converter 19 is built in the ASIC 40 may be adopted.

The charge and discharge controller 21 includes a microcomputer and its peripheral circuits, calculates the voltage value and current value of a charge current required to be outputted from the charger 2 in response to the respective input values via the analog/digital converter 19 and transmits them to the charger 2 via the terminals T12, T22; T13, T23 from the communicator 22. The charge and discharge controller 21 also performs a protection operation of, for example, cutting off the FETs 12, 13 off when detecting an abnormality outside the battery pack 1 such as a short circuit between the terminals T11 and T13 or an abnormal current from the charger 2 based on the input values received via the analog/digital converter 19 or when detecting an abnormal temperature increase of the assembled battery 14 by the temperature sensor 17.

On the other hand, the terminal voltages of the respective cells of the assembled battery 14 are read not only by the ASIC 40, but also by a double protection IC 23 connected with the assembled battery 14 in parallel to the ASIC 40. If a detection result by the double protection IC 23 becomes equal to or higher than a threshold value in the double protection IC 23 set equal to or higher than a threshold value for the determination of abnormality in the charge and discharge controller 21, the double protection IC 23 switches ON a FET 27. The FET 27 is provided for the fuses 24, 25 arranged in series in the charge path 11, and a node of the fuses 24, 25 is grounded via a heating resistor 26 and this FET 27. Accordingly, the fuses 24, 25 are melted by heat generated by the heating resistor 26 when the charge and discharge controller 21 switches ON the FET 27. Thus, a double protection operation is realized by the melting of the fuses 24, 25 in the event of serious abnormality in which the overcharge of the cells and the like cannot be dealt with due to the abnormality of the charge and discharge controller 21.

For example, a threshold voltage for overvoltage in the regular charging/discharging processes in which the charge and discharge controller 21 switches OFF the FETs 12, 13 is 4.35 V per cell, and a threshold voltage at which the double protection IC 23 melts the fuses 24, 25 is, for example, 4.4 V per cell. Accordingly, the battery pack 1 can be restored when an overvoltage occurs in regular processes, but cannot be reused when an overvoltage occurs in an event of abnormality, thereby improving safety.

When the FET 27 is switched ON by the double protection IC 23, the two fuses 24, 25 are melted by the heat generated in the heating resistor 26. At this time, in a charging state, even if the fuse 25 closer to the assembled battery 14 is melted earlier, the fuse 24 closer to the charger 2 is melted later by a charge current supplied from the charger 2. Even if the fuse 24 closer to the charger 2 is melted earlier, the fuse 25 closer to the assembled battery 14 can also be melted if the assembled battery 14 can supply a current for driving the FET 27 to the double protection IC 23. If the assembled battery 14 can supply no current, the fuse 25 closer to the assembled battery 14 remains unmelted, but a part closer to the assembled battery 14 than the node can be separated from the outside of the battery pack 1 in a reliable manner.

On the contrary, if the assembled battery 14 can supply a current for driving the FET 27 to the double protection IC 23 in such a discharging state where the battery pack 1 is not set in the charger 2, the fuse 25 closer to the assembled battery 14 is melted later even if the fuse 24 closer to the charger 2 is melted earlier. If the fuse 25 closer to the assembled battery 14 is melted earlier, the fuse 24 closer to the charger 2 remains unmelted, but the part closer to the assembled battery 14 than the node can be separated from the outside of the battery pack 1 in a reliable manner.

By grounding the node of the fuses 24, 25 connected in series via the heating resistor 26 and the FET 27 in the foregoing manner, the part closer to the assembled battery 14 than the node can be separated from the outside of the battery pack 1 in a reliable manner regardless of whether or not the battery pack 1 is set in the charger 2.

On the other hand, in the charger 2, an output request from the battery pack 1 is received by a communicator 32 of a control IC 30, a charge controller 31 controls a charge current supply circuit 33 to supply a charge current of the above voltage value and current value. The charge current supply circuit 33 includes an AC-DC converter and a DC-DC converter, and converts an input voltage into a voltage of the voltage value, current value and pulse width instructed by the charge controller 31 and supplies the converted voltage to the charge paths 11, 15 via the terminals T21, T11; T23, T13.

Figure 2:
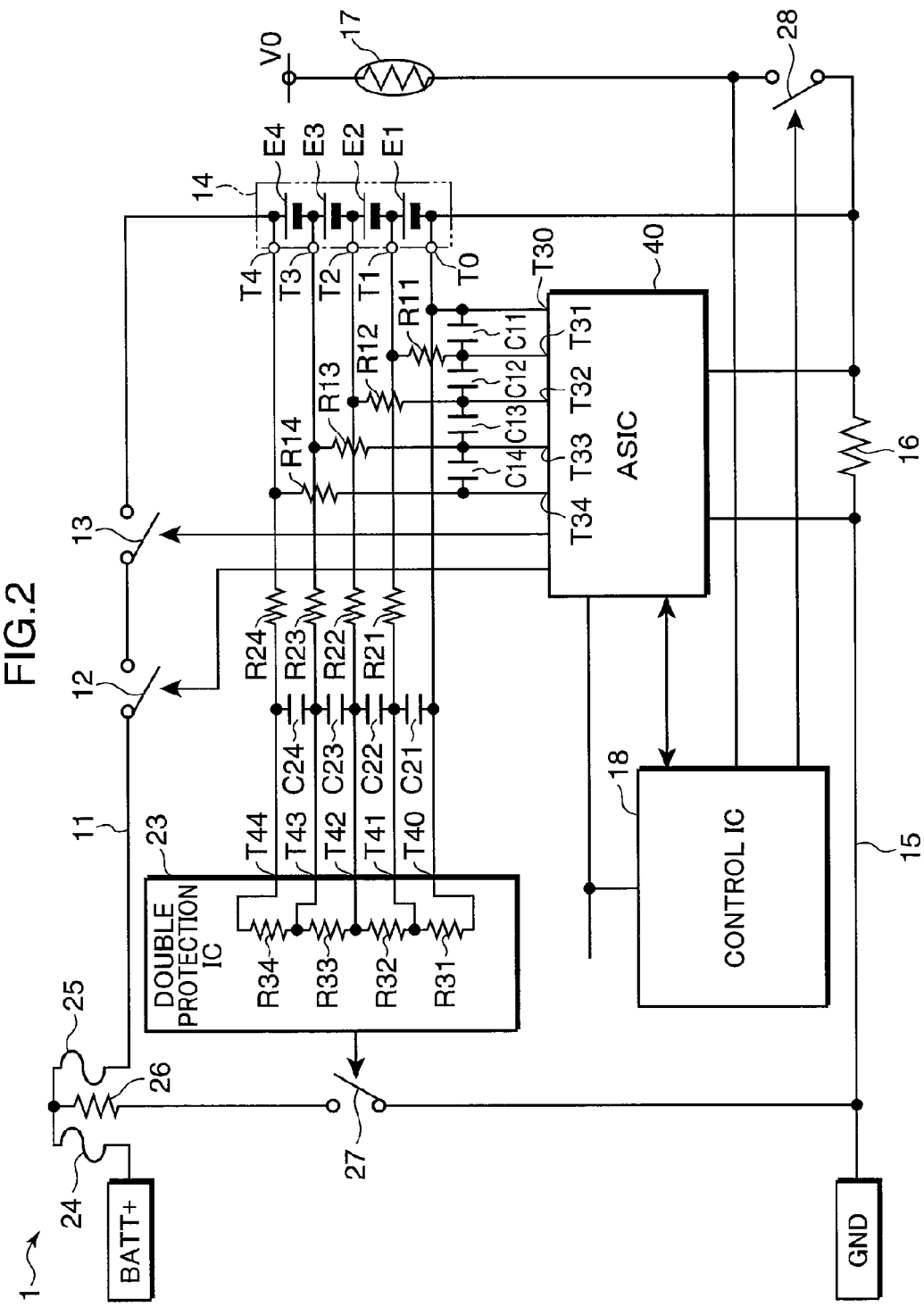
FIG. 2 is a block diagram showing the internal structure of a battery pack 1 of FIG. 1.

FIG. 2 is a block diagram showing the structure in the battery pack 1 in more detail. In an example of FIG. 2, the assembled battery 14 is made up of four cells E1 to E4, a terminal T4 is connected to the terminal T11 of the high voltage side charge path 11, and a GND terminal T0 is connected to the terminal T13 of the low voltage charge path 15. These four cells E1 to E4 are connected in series between the terminals T0 to T4, and each of the cells E1 to E4 may be comprised of a plurality of cells connected in parallel with each other. Nodes of the respective cells E1 to E4 are connected with terminals T1 to T3, which are intermediate taps.

Figure 3:
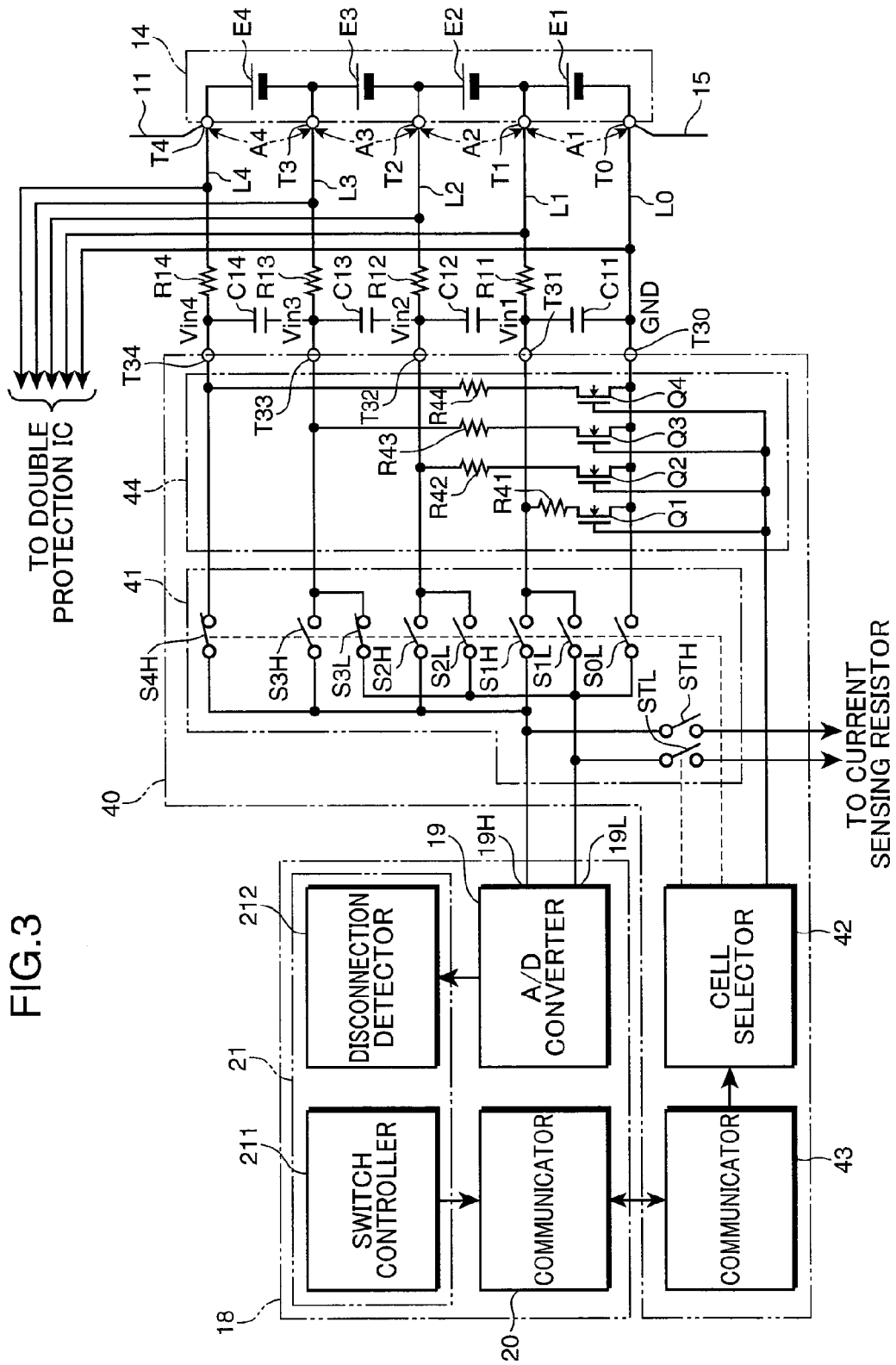
FIG. 3 is a block diagram showing example structures of an ASIC 40 and a control IC 18 of FIG. 2.

FIG. 3 is a block diagram showing an example structure of the ASIC 40 and a partial structure relating to the voltage measurement of the control IC 18. In FIGS. 2 and 3, connection lines L0 to L4 are connected with the respective terminals T0 to T4 and, in the ASIC 40 and the double protection IC 23, voltages Vin1 to Vin4 at the terminals T1 to T4 except the GND terminal T0 are read from terminals T30 to T34; T40 to T44 via input resistors R11 to R14 and input resistors R21 to R24 so as not to affect the mutual voltage detections thereof. When necessary, noise removal capacitors C11 to C14; C21 to C24 may be provided between the respective terminals T30 to T34; T40 to T44. These capacitors C11 to C14; C21 to C24 may be provided between the respective terminals T30 to T34; T40 to T44 and the ground GND instead of between the respective terminals T30 to T34; T40 to T44. Resistors R31 to R34 for equally dividing the voltage Vin4 are provided between the respective input terminals T40 to T44 of the double protection IC 23.

The temperature sensor 17 includes a thermistor and the like and has one end thereof biased at a predetermined voltage V0 while having the other end thereof connected with the low voltage side of the charge path 15 via a switch 28 ON/OFF driven by the control IC 18 and the current sensing resistor 16, and a voltage at a node with the switch 28 is read by the analog/digital converter 19 of the control IC 18.

The respective terminals T30 to T34 are selectively connected to the analog/digital converter 19 of the control IC 18 for voltage measurement via an input switching section 41. The input switching section 41 includes switches S0L; S1L, S1H; S2L, S2H; S3L, S3H; S4H; STL, STH.

One ends of the switches S0L; S1L, S1H; S2L, S2H; S3L, S3H; S4H are connected to the respective terminals T30 to T34, and the other ends thereof are connected to a high voltage side input terminal 19H or a low voltage side input terminal 19L of the analog/digital converter 19. The switches STL, STH have one ends thereof connected to the respective terminals of the current sensing resistor 16 and the other ends thereof connected to the high voltage side input terminal 19H and the low voltage side input terminal 19L. The switches S0L; S1L, S1H; S2L, S2H; S3L, S3H; S4H; STL STH are selectively driven on and off by a cell selector 42.

Accordingly, the analog/digital converter 19 can detect a voltage between the terminals of the current sensing resistor 16, thus, the charge and discharge currents of the respective cells E1 to E4, for example, by switching ON the switches STL, STH and switching OFF the switches S0L; S1L, S1H; S2L, S2H; S3L, S3H; S4H. Further, the analog/digital converter 19 can detect the charge voltage or discharge voltage into or from the entire assembled battery 14, for example, by switching ON the switches S0L, S4H and switching OFF the switches S1L, S1H; S2L, S2H; S3L, S3H; S5L, S5H.

Switching signals for the switches S0L; S1L, S1H; S2L, S2H; S3L, S3H; S4H; STL STH are generated by a switch controller 21 in the charge and discharge controller 21 of the control IC 18, and fed from the communicator 20 to the cell selector 42 via a communicator 43 of the ASIC 40. A disconnection detector 212 in the charge and discharge controller 21 detects a disconnection as described later from a detection result obtained in the analog/digital converter 19.

What should be noted is that a short-circuiting circuit 44 including series circuits comprised of short-circuit resistors R41 to R44 and switches Q1 to Q4 paired with the resistors R41 to R44 is provided between the respective terminals T41 to T34 and the GND terminal T30. The switches Q1 to Q4 are ON/OFF controlled by the cell selector 42 in accordance with a switching signal from the switch controller 211 received via the communicator 43. When the switches Q1 to Q4 are switched ON, the respective terminals T31 to T34 connected to the respective switches Q1 to Q4 are short-circuited to the GND terminal T30 via the short-circuit resistors R41 to R44.

Figure 4:
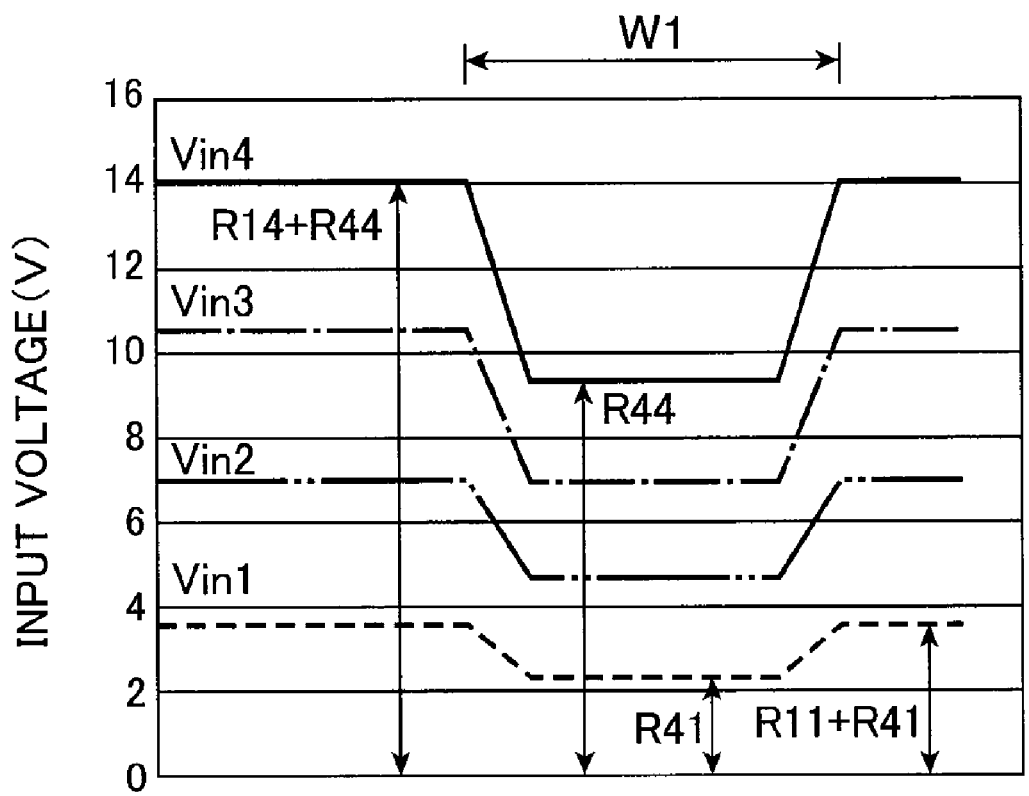
FIG. 4 is a waveform chart showing an operation of detecting the floating (disconnection) of an intermediate tap according to the first embodiment of the invention.
Figure 5:
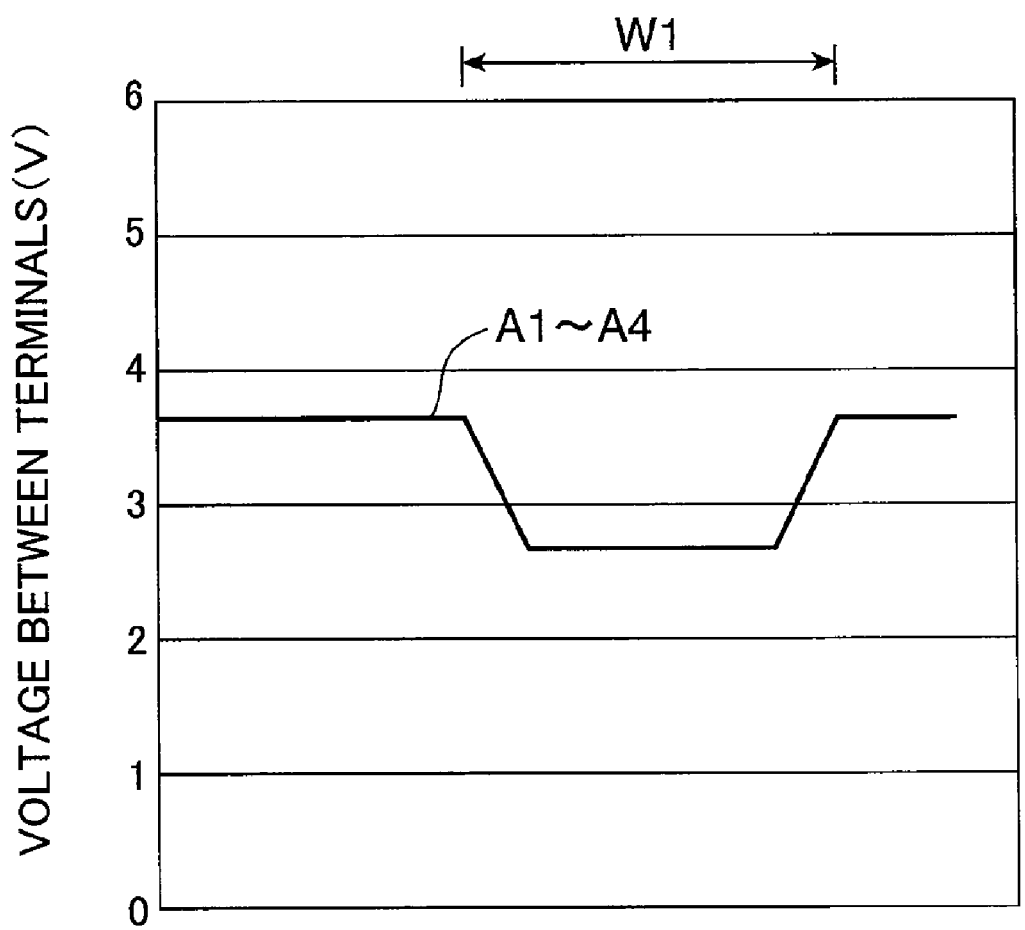
FIG. 5 is a waveform chart showing the operation of detecting the floating (disconnection) of the intermediate tap according to the first embodiment of the invention.
Figure 6:
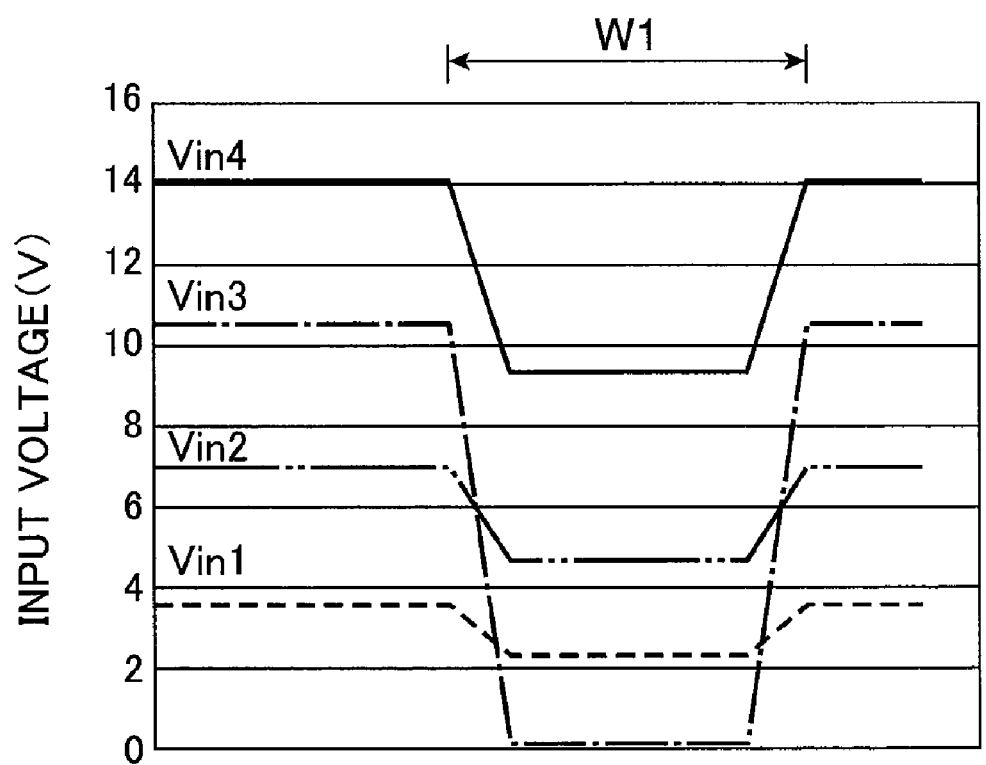
FIG. 6 is a waveform chart showing the operation of detecting the floating (disconnection) of the intermediate tap according to the first embodiment of the invention.
Figure 7:
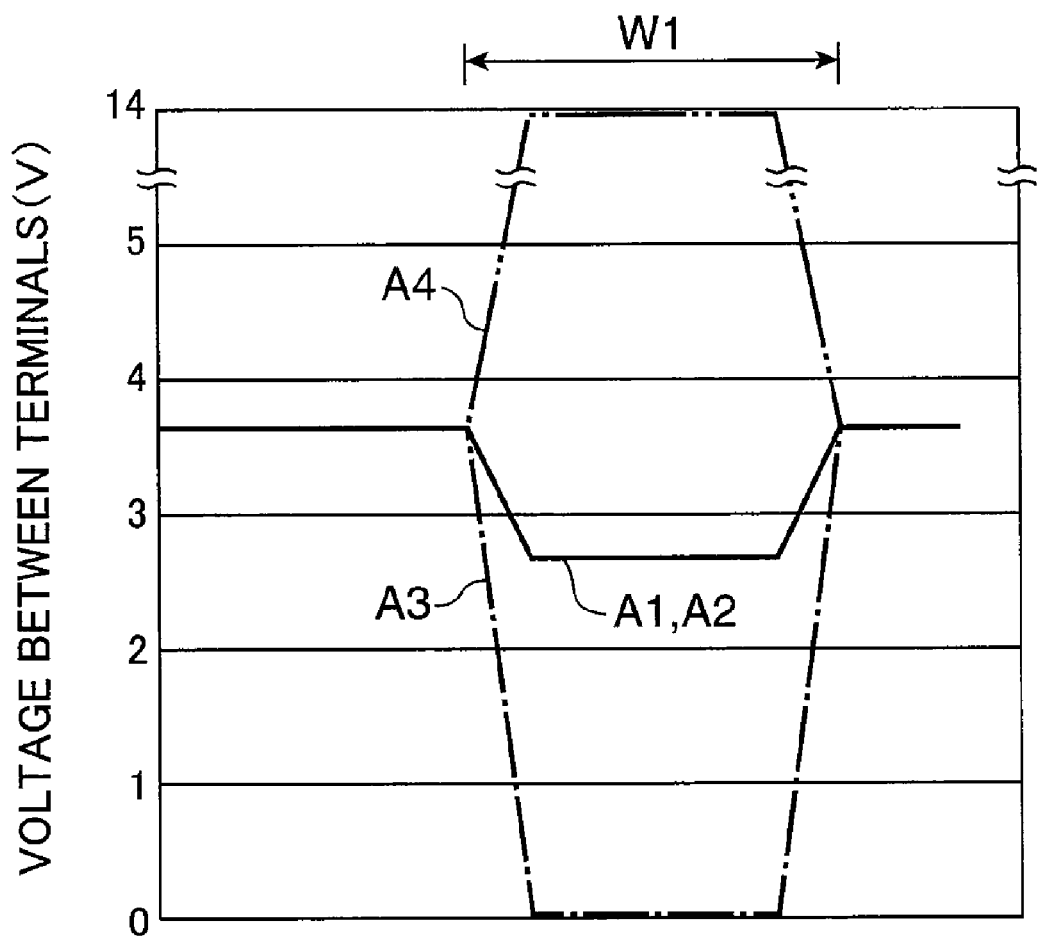
FIG. 7 is a waveform chart showing the operation of detecting the floating (disconnection) of the intermediate tap according to the first embodiment of the invention.

FIGS. 4 to 7 are waveform charts showing an operation of detecting the disconnection of the connection lines L1 to L3, i.e. the floating (disconnection) of the terminals T1 to T3 as intermediate taps by the disconnection detector 212. When carrying out this process of detecting a disconnection, the switch controller 211 maintains the switches STL, STH in the OFF state. FIGS. 4 and 5 are waveform charts in regular processes and FIGS. 6 and 7 are waveform charts when the terminal T3 is floating (disconnected).

Firstly, FIG. 4 shows changes in the voltages Vin1 to Vin4. When the switch controller 211 switches ON the switch S0L corresponding to the connection line L0 of the GND and selectively switches ON the switches S1H, S2H, S3H, S4H corresponding to the high voltage sides of the connection lines L1 to L4 with the low voltage side switches S1L, S2L, S3L in the OFF state, the analog/digital converter 19 can read changes in the voltages Vin1 to Vin4. During a period W1, the short-circuit switches Q1 to Q4 corresponding to the respective connection lines L1 to L4 are selectively switched ON by the cell selector 42, whereby the respective voltages Vin1 to Vin4 decrease to voltages at a voltage dividing ratio (about 1:2) by the input resistors R11 to R14 and the short-circuit resistors R41 to R44.

On the other hand, FIG. 5 is the waveform chart showing changes in cell voltages A1 to A4 between the respective terminals T0 to T4. When the switch controller 211 switches ON pairs of low voltage side switches S0L, S1L, S2L, S3L and switches ON high voltage side switches S1H, S2H, S3H, S4H, the analog/digital converter 19 can read changes in the cell voltages A1 to A4. Without an event of an abnormality, the respective cell voltages A1 to A4 change to voltages at a similar voltage dividing ratio (about 1:2) determined by the input resistors R11 to R14 and the short-circuit resistors R41 to R44.

On the contrary, if, for example, the terminal T3 floats, the voltages Vin1, Vin2, Vin4 in the lines other than the line L3 out of the voltages Vin1 to Vin4 change in the same manner as in FIG. 4, whereas the voltage Vin3 corresponding to the disconnected line L3 is decreased substantially to a GND potential by the short-circuit resistor R43 when the short-circuit switch Q3 is switched ON. This voltage drop substantially to the GND potential by the short-circuit resistor R43 is described below.

The resistance values of the input resistors R11 to R14; R21 to R24 are, for example, in the order of kΩ, whereas those of the voltage dividing resistors R31 to R34 in the double protection IC 23 are equal to each other and, for example, in the order of MΩ. Accordingly, even if the terminal T3 floats (is disconnected), a voltage obtained by dividing the voltage Vin4 by the voltage dividing resistors R31 to R34 in the double protection IC 23 appears as the voltage Vin3 if the short-circuit switch Q3 is in the OFF state, which is the same state as normal state (here, the cells E1 to E4 are equally balanced (generate the same voltages). On the contrary, if the short-circuit switch Q3 is switched ON, the voltage Vin4 is consumed by the voltage dividing resistor R34 having a large resistance value and the voltage Vin3 of the terminal T3 decreases substantially to the GND potential as described above.

In FIG. 7, if the terminal T3 floats (is disconnected), the cell voltages A1, A2 not using the floating (disconnected) line L3 for voltage detection change in the same manner as in FIG. 6. On the contrary, the cell voltage A3 using the disconnected line L3 as the high voltage side is decreased substantially to the GND potential by the short-circuit resistor R43 in the same manner as described above when the short-circuit switch Q3 is switched ON. Accordingly, the cell voltage A4 using the disconnected line L3 as the low voltage side for voltage detection increases substantially to Vin4 when the short-circuit switch Q4 is switched ON.

Figure 8:
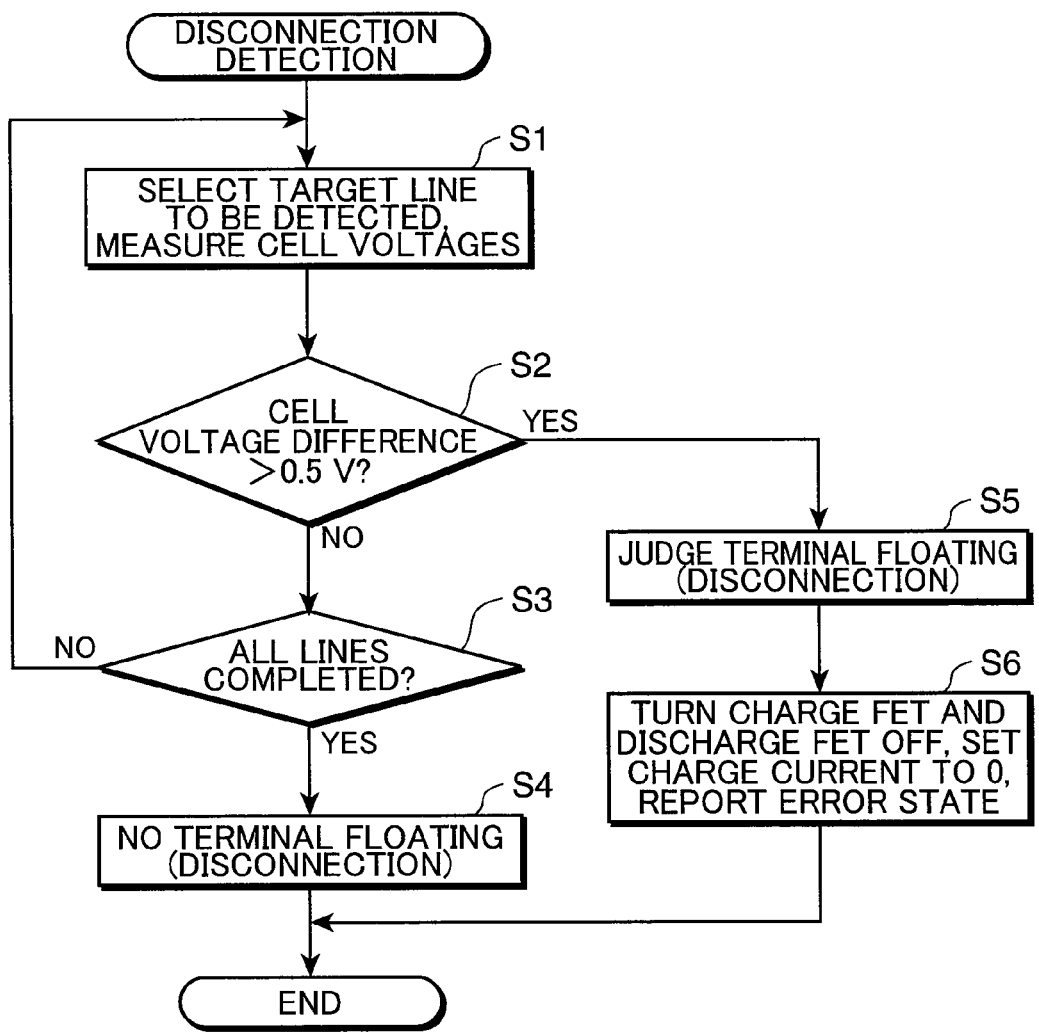
FIG. 8 is a flow chart showing the procedure of the operation of detecting the floating (disconnection) of the intermediate tap according to the first embodiment of the invention.

FIG. 8 is a flow chart showing the disconnection detection operation by the disconnection detector 212 of the foregoing structure. In an example of FIG. 8, disconnection detection is made based on changes in the cell voltages A1 to A4 shown in FIGS. 5 and 7. It is assumed that the analog/digital converter 19 has, for example, a power supply of 3.3 V and an input voltage dynamic range of 2.5 V. Therefore, a voltage between the input terminals 19H, 19L is inputted while being divided into ⅓.

In Step S1, a target line to be detected is selected in accordance with a switching signal from the switch controller 211 of the control IC 18. The cell selector 42 connects the connection lines L0 to L4 from the terminal T0 to T4 of the target cell to the input terminals 19L, 19H of the analog/digital converter 19 by means of the switches S0L; S1L, S1H; S2L, S2H; S3L, S3H; S4L, whereby a voltage measurement by the analog/digital converter 19 is performed. Further, the cell selector 42 selectively switches ON the short-circuit switches Q1 to Q4. Therefore, a voltage measurement by the analog/digital converter 19 is performed again.

In Step S2, it is determined whether a difference in voltage between the OFF state and ON state of each of the short-circuit switches Q1 to Q4 is larger than a predetermined threshold voltage which is set based on the input resistor R11 to R14, the short-circuit resistor R41 to R44 and the cell voltage, e.g. 0.5 V. When the difference in voltage is smaller than the threshold voltage (NO in Step S2), it is determined whether the cell voltages A1 to A4 have been measured for all the target lines for detection in Step S3. Unless all the measurements have been completed (NO in Step S3), this routine returns to Step S1. On the other hand, when all the measurements have been completed (YES in Step S3), all the target lines for detection are determined to be in normal state in Step S4, thereby terminating the process.

On the other hand, if a difference in voltage of the detected cell voltage A1 to A4 is larger than the threshold voltage, e.g. 0.5 V (YES in Step S2), it is determined that an abnormality, i.e. floating (disconnection) has occurred in Step S5 and the charge and discharge controller 21 of the control IC 18 controls the FETs 12, 13 to be switched OFF in Step S6; in the meantime, sets the current value of the required charge current to 0, and reports an error state, thereby terminating the process.

According to the foregoing structure, the disconnection detector 212 can reliably detect the disconnection of the connection line L1 to L3, i.e. the floating (disconnection) of the terminal T1 to T3 as the intermediate tap from a deviation between a voltage expected to be the voltage Vin1 to Vin4 or cell voltage A1 to A4 at the node based on the control states of the short-circuit switch Q1 to Q4 and the switches S0L; S1L, S1H; S2L, S2H; S3L, S3H; S4H and a voltage actually detected by the analog/digital converter 19. Therefore, in an event of an abnormality, the charging operation can be terminated before a problem of an overcharge arises. Further, since the short-circuit resistors R41 to R44 are driven upon detecting a disconnection, no loss occurs in regular processes, thereby reducing loss.

The detection result of the disconnection detector 212 is used for the charging/discharging control in the charge and discharge controller 21. Here, if the terminals T0, T4 are disconnected, neither charging nor discharging can be performed, wherefore there is no safety problem. On the contrary, if the terminal T1 to T3 as the intermediate tap is disconnected from the connection line L1 to L3 to the ASIC 40 and the double protection IC 23, a voltage applied to each cell cannot be known and, even if the charge voltages between the terminals T0 to T4 are kept at a specified voltage by the charger 2, there is a likelihood of overvoltage or overcharge in a specific cell due to a cell balance disorder. Accordingly, the charge and discharge controller 21 prohibits the charging/discharging operation by switching OFF the FETs 12, 13 upon detecting the floating (disconnection) of the terminal T1 to T3. Thus, safety in the floating (disconnection) of the terminals T1 to T3 can be ensured. Incidentally, it may be arranged such that the charge and discharge controller 21 switches ON the FET 27 to melt the fuses 24, 25 upon detecting the floating (disconnection) of the terminals T1 to T3 to completely terminate the charging/discharging process.

Particularly, in the case of providing, in addition to the ASIC 40 for performing voltage detection, the double protection IC 23 for performing the protection operation by detecting the terminal voltages of the respective cells E1 to E4 and detecting abnormality based on the threshold value equal to or higher than that of the charge and discharge controller 21, the double protection IC 23 and the ASIC 40 are connected in parallel to the terminals T0 to T4 of the respective cells E1 to E4, wherefore the detection of the disconnection of the respective connection lines L0 to L4, i.e. the floating (disconnection) of the terminals T0 to T4 becomes even more difficult, for example, because of the input resistors R11 to R14, R21 to R24, the capacitors C11 to C14, C21 to C24 and, further, the internal voltage dividing resistors R31 to R34 as described above. Therefore, the present invention is particularly effective.

Although the floating (disconnection) of the terminals T1 to T3 is detected by short-circuiting the respective connection lines L1 to L4 to the GND line L0 in the above embodiment, the respective connection lines L0 to L3 may be short-circuited to the high voltage side of the connection line L4 or may be short-circuited to each other.

Second Embodiment

Figure 9:
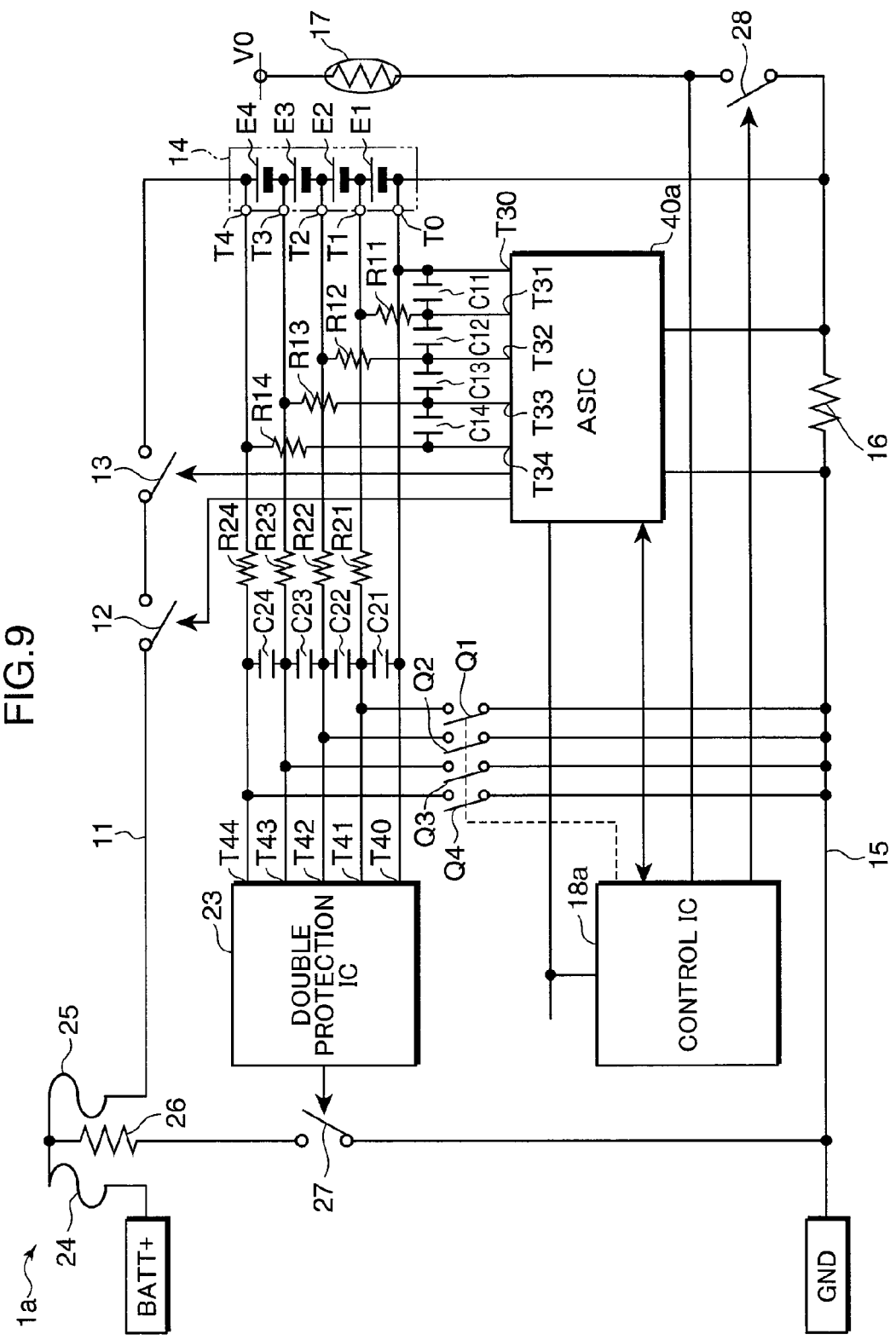
FIG. 9 is a block diagram showing the electrical structure of a battery pack employing a disconnection detection method according to a second embodiment of the invention.

FIG. 9 is a block diagram showing the electrical structure of a battery pack 1a employing a disconnection detection method according to a second embodiment of the present invention. This battery pack 1a is similar to the above battery pack 1 shown in FIG. 2, and corresponding parts are identified by the same reference numerals and are not described. This battery pack 1a can also build a similar charging system by being combined with the charger 2 shown in FIG. 1.

In this battery pack 1a, the respective connection lines L1 to L4 connected with the terminals T1 to T4 are short-circuited to the GND line L0 via the short-circuit switches Q1 to Q4 arranged at an input side of a double protection IC 23, and the short-circuit switches Q1 to Q4 are ON/OFF controlled by a control IC 18a. In this case, a conventional ASIC including no short-circuiting circuit 44 can be used as an ASIC 40a.

In this case, the input resistors R21 to R24 of the double protection IC 23 function as the short-circuit resistors, and the threshold voltage (0.5 V in the above embodiment) for use in determining if a floating (disconnection) occurs can be suitable selected in accordance with each circuit structure.

As described, the battery pack and the detection method in the battery pack in accordance with the first and second embodiments of the present invention applied to the battery pack which includes an assembled battery including a plurality of secondary battery cells connected at least in series; a voltage detector which detects a terminal voltage of each of the plurality of secondary battery cells; a charge/discharge controller which controls charge/discharge of the assembled battery based on the terminal voltage of each cell detected by the voltage detector, and which prevents an occurrence of an overvoltage or an overcharge of a specific cell, for example, due to a shift in cell balance as occurred in the charging process; includes: a short-circuiting section which short-circuits a node between cells to the high voltage side or the low voltage side of a power line, or which short-circuits nodes between the cells to each other; and a disconnection detector which controls conduction/non-conduction of the short-circuiting section and which detects a disconnection of the connection line from the voltage detector to the node between the cells, based on a state of controlling the conduction/non-conduction, and at least one of a voltage at the node between the cells detected by the voltage detector, a voltage of the high voltage side or the low voltage side of the power line, and a terminal voltage of each cell.

Accordingly, the disconnection can be reliably detected from a deviation between a voltage expected from at least one of the voltage at the node, the voltage on the power line and the terminal voltages of the respective cells and a voltage actually detected by the voltage detection means through the selective driving of the short-circuiting means by the disconnection detection means, although it is difficult to detect the disconnection of the connection line only from the terminal voltages of the respective cells, for example, because of the input resistance and capacitance of a circuit connected to the terminals of the respective cells. Therefore, in an event of an abnormality, the charging operation can be terminated before a problem of overcharge arises. Since the short-circuiting section is driven upon detecting a disconnection, no loss occurs in regular processes, wherefore loss can be reduced.

Figure 10:
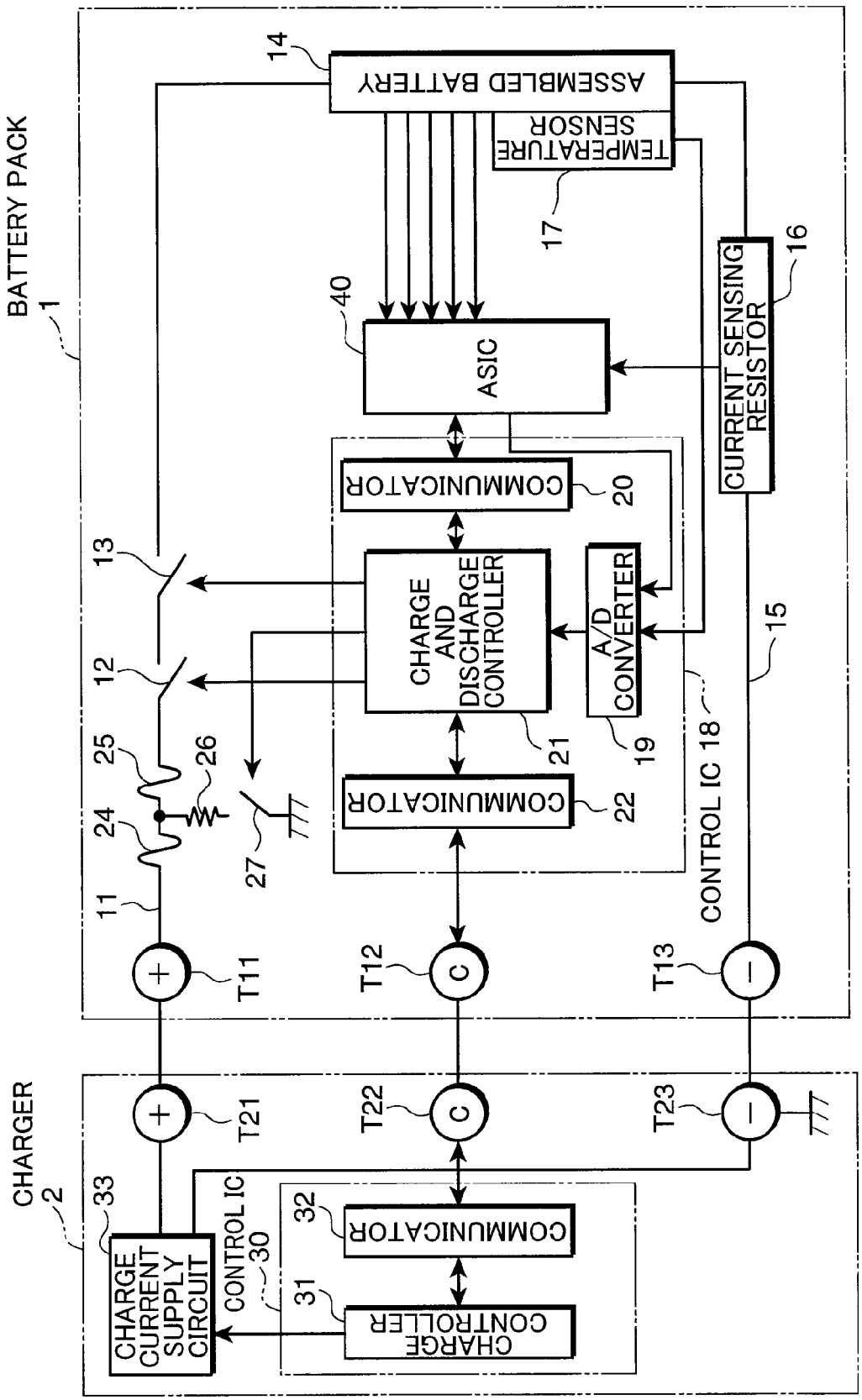
FIG. 10 is a block diagram showing the electrical structure of a charging system employing a disconnection detection method according to another embodiment of the invention.

Although the foregoing first and second embodiments are directed to the charging systems including the double protection IC 23, the present invention is also applicable to the structure wherein the battery pack 1 includes no double protection IC 23 as shown in FIG. 10. It may be also arranged such that the charge and discharge controller 21 switches OFF the FETs 12, 13 to terminate the charging/discharging operation upon detecting a disconnection, or switches ON the FET 27 to melt the fuses 24, 25 to completely terminate the charging/discharging process.

Figure 11:
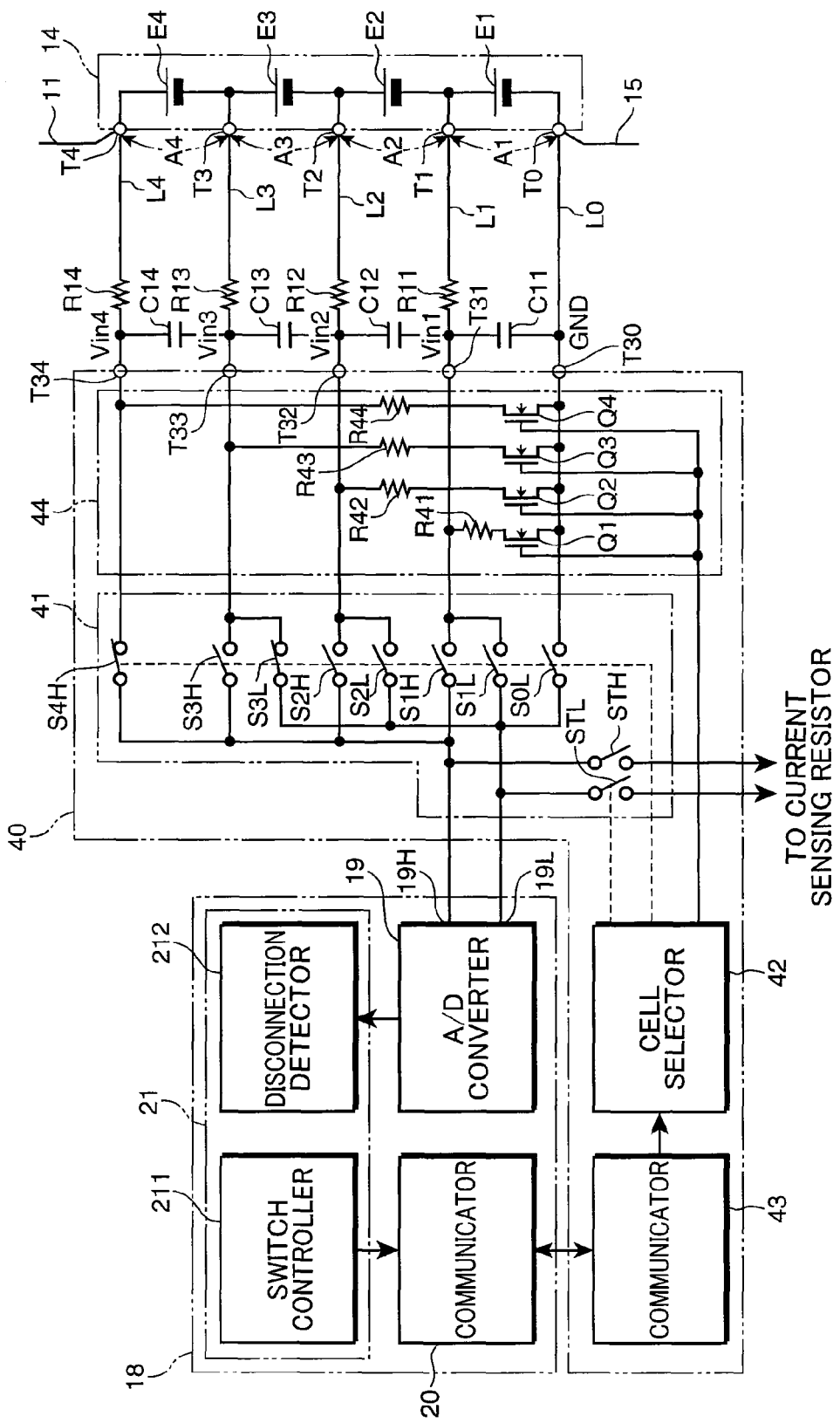
FIG. 11 is a block diagram showing example structures of an ASIC 40 and a control IC 18 of FIG. 10.

With such structure wherein the R11 to R14 have the same resistance and C11 to C14 have the same capacitance, even without the double protection IC 23 as shown in FIG. 11, the potential of the terminal T31 comes to take an average value of the cell voltages A1, A2 of the cells E1, E2, for example, in the case of disconnection in L1. Thus, it may not be possible to detect disconnection according to the conventional method even in the absence of the double protection IC 23. Therefore, the beneficial feature of the present invention can be appreciated also with the structure without the double protection IC 23.

The present invention is summarized as follows from the above respective embodiments. Specifically, the battery pack in accordance with one aspect of the present invention includes: an assembled battery including a plurality of secondary battery cells connected at least in series; a voltage detector which detects a terminal voltage of each of the plurality of secondary battery cells; a charge/discharge controller which controls charge/discharge of the assembled battery based on the terminal voltage of each cell detected by the voltage detector; a short-circuiting section which short-circuits a node between cells to the high voltage side or the low voltage side of a power line, or which short-circuits nodes between the cells to each other; and a disconnection detector which controls conduction/non-conduction of the short-circuiting section and which detects a disconnection of the connection line from the voltage detector to the node between the cells, based on a state of controlling the conduction/non-conduction, and at least one of a voltage at the node between the cells detected by the voltage detector, a voltage of the high voltage side or the low voltage side of the power line, and a terminal voltage of each cell.

The battery pack of the foregoing structure includes the assembled battery including the plurality of secondary battery cells connected at least in series (a plurality of cells may be suitably connected also in parallel when necessary), the voltage detector and the charge and discharge controller, and the charge/discharge controller controls the charging/discharging to prevent an occurrence of an overvoltage or an overcharge of a specific cell, for example, due to a shift in cell balance in the charging operation based on the terminal voltages of the respective cells detected by the voltage detector. In this battery pack, the short-circuiting section which short-circuits the connection codes between the cells, i.e. intermediate taps to the high voltage side or the low voltage side of the power lines or which short-circuits the nodes to each other includes the disconnection detector which controls conduction/non-conduction of the short-circuiting section and which detects a disconnection of the connection line from the voltage detector to the node based on the state of controlling the conduction/non-conduction, and at least one of a voltage at the node between the cells detected by the voltage detector, a voltage of the high voltage side or the low voltage side of the power line, and a terminal voltage of each cell.

Accordingly, the disconnection of the connection line can be reliably detected from a deviation between a voltage expected from at least one of the voltage at the node between the cells, the voltage on the power line and the terminal voltages of the respective cells and a voltage actually detected by the voltage detector through the selective driving of the short-circuiting section by the disconnection detector, although it is difficult to detect the disconnection of the connection line from the voltage detector to the node only from the terminal voltages of the respective cells, for example, because of the input resistance and capacitance of a circuit connected to the terminals of the respective cells. It is therefore possible to terminate the charging operation in an event of an abnormality before a problem of overcharge arises. Since the short-circuiting section is driven upon detecting a disconnection, no loss occurs in regular processes, wherefore loss can be reduced.

With the foregoing structure of the above battery pack, it is preferable that the short-circuiting section includes a series circuit made up of a resistor and a switch, and the series circuit short-circuits the high voltage side of the power line and the node between the cells respectively to the low voltage side of the power line.

In this case, the terminals of the respective cells are connected to the low voltage sides of the power lines via input resistors and the short-circuit resistors connected to the high voltage sides of the power lines or the nodes between the cells in response to a request from the disconnection detector by ON/OFF controlling the switches.

Thus, the disconnection detector can detect the disconnection of the connection line from the voltage detector to the node based on a voltage inputted to the voltage detector via the input resistor connected when the switch is in the OFF state and a voltage divided by the input resistor and the short-circuit resistor when the switch is in the ON state.

With the foregoing structure of the battery pack, it is preferable that the voltage detector includes: an analog/digital converter which measures a voltage of the node between cells, and an input switching section capable of selectively connecting the node between the cells to the analog/digital converter, wherein the node between the cells is short-circuited by the short-circuiting section after being connected to the analog/digital converter by the input switching section.

According to the foregoing structure, it is possible to measure a voltage after the short-circuiting section short-circuits the node between the cells in a reliable manner.

With the foregoing structure of the battery pack, it is preferable to further include a cell selector which controls the short-circuit section to short-circuit the node between the cells and the analog/digital converter after connecting the node to the analog/digital converter by the input switching section.

According to the foregoing structure, voltages before and after the short-circuiting of the node between the cells can be measured in a reliable manner since the cell selector controls both the connection of the analog/digital converter and the node between the cells and the short-circuiting of the nodes between the cells to each other.

With the foregoing structure of the battery pack, it is preferable that the voltage detector and the short-circuiting section be integrally constructed as an ASIC.

According to the foregoing structure, it is possible to prevent the charging/discharging operation of the assembled battery from being continued in a state where the node between the cells and the voltage detector is disconnected only by mounting this ASIC into a general-purpose battery pack. Since the short-circuiting section in this ASIC short-circuits the terminals of the secondary battery cells only upon detecting a disconnection, it is not likely that currents are not consumed by the short-circuiting section in regular processes. Therefore, an increase of the loss by the short-circuiting section can be suppressed.

With the foregoing structure of the battery pack, it is preferable that the charge/discharge controller performs a protection operation upon detecting an abnormality by comparing a result of detection by the voltage detector with a predetermined threshold value, and further includes a double protection IC, which detects a terminal voltage of each cell by the voltage detector, and which performs a protection operation upon detecting an abnormality by comparing a voltage detected by the voltage detector with a threshold voltage set to or above that of the charge/discharge controller.

In this case, the double protection IC is provided separately from the voltage detector to detect the terminal voltages of the respective cells, to detect an occurrence of an abnormality such as an overvoltage or an overcharge by comparing the detection result with the threshold value equal to or higher than that of the charge and discharge controller and to perform the protection operation. Thus, this double protection IC and the voltage detector are connected in parallel with the terminals of the respective cells, wherefore the detection of disconnection of the connection lines to the terminals of the respective cells becomes more difficult due to the resistance and capacitance of the input and, further, the internal voltage dividing resistance. The present invention is particularly effective when the double protection IC is provided.

The method for detecting a disconnection of a battery pack in accordance with one aspect of the present invention which includes an assembled battery including a plurality of secondary battery cells connected at least in series, includes the steps of: short-circuiting a node between cells to a high-voltage side or a low-voltage side of a power line, or short-circuiting the node between the cells to each other; and detecting a disconnection of the connection line to the node between the cells, based on a short-circuit state in the short-circuiting step, and at least one of a voltage at the node between the cells after being short-circuited by the short-circuiting step, a voltage of the high voltage side or the low voltage side of the power line, and a terminal voltage of each cell.

According to the foregoing method for detecting the disconnection applied to the battery pack which includes an assembled battery including a plurality of secondary battery cells connected at least in series; a voltage detector which detects a terminal voltage of each of the plurality of secondary battery cells; a charge/discharge controller which controls charge/discharge of the assembled battery based on the terminal voltage of each cell detected by the voltage detector, and which prevents an occurrence of an overvoltage or an overcharge of a specific cell, for example, due to a shift in cell balance as occurred in the charging process, includes the steps of short-circuiting a node between cells to a high-voltage side or a low-voltage side of a power line, or short-circuiting the node between the cells to each other; and detecting a disconnection of the connection line to the node between the cells, based on a short-circuit state in the short-circuiting step, and at least one of a voltage at the node between the cells after being short-circuited by the short-circuiting step, a voltage of the high voltage side or the low voltage side of the power line, and a terminal voltage of each cell.

Accordingly, it is possible to detect a disconnection of the connection line in a reliable manner from a deviation between a voltage expected from at least one of the voltage at the node, the voltage on the power line and the terminal voltages of the respective cells and an actually detected voltage, although it is difficult to detect the disconnection of the connection line to the node only from the terminal voltages of the respective cells, for example, because of the input resistance and capacitance of a circuit connected to the terminals of the respective cells. Therefore, in an event of an abnormality, the charging operation can be terminated before a problem of overcharge arises. Since the nodes between the respective cells are short-circuited upon detecting a disconnection, no loss occurs in regular processes, wherefore loss can be reduced.

INDUSTRIAL APPLICABILITY

According to the present invention, the floating (disconnection) of intermediate taps in an assembled battery including a plurality of secondary battery cells connected at least in series can be reliably detected without causing losses in regular processes such as when a pull-up resistor is used while suppressing the influence of input resistance and input capacitance.

What is claimed is:

1. A battery pack, comprising:
an assembled battery including a plurality of secondary battery cells connected at least in series;
a voltage detector which detects a terminal voltage of each of said plurality of secondary battery cells;
a charge/discharge controller which controls charge/discharge of the assembled battery based on the terminal voltage of each cell detected by the voltage detector;
a short-circuiting section which short-circuits a node between cells to the high voltage side or the low voltage side of a power line, or which short-circuits nodes between the cells to each other; and
a disconnection detector which controls conduction/non-conduction of said short-circuiting section and which detects a disconnection of the connection line from the voltage detector to the node between the cells, based on a state of controlling the conduction/non-conduction, and at least one of a voltage at the node between the cells detected by said voltage detector, a voltage of the high voltage side or the low voltage side of the power line, and a terminal voltage of each cell,
wherein:
the short-circuiting section includes a series circuit made up of a resistor and a switch, and said series circuit short-circuits the high voltage side of the power line and the node between the cells respectively to the low voltage side of the power line.

2. A battery pack according to claim 1, wherein the voltage detector and the short-circuiting section are integrally constructed as an ASIC.

3. A battery pack, comprising:
an assembled battery including a plurality of secondary battery cells connected at least in series;
a voltage detector which detects a terminal voltage of each of said plurality of secondary battery cells;
a charge/discharge controller which controls charge/discharge of the assembled battery based on the terminal voltage of each cell detected by the voltage detector;
a short-circuiting section which short-circuits a node between cells to the high voltage side or the low voltage side of a power line, or which short-circuits nodes between the cells to each other; and
a disconnection detector which controls conduction/non-conduction of said short-circuiting section and which detects a disconnection of the connection line from the voltage detector to the node between the cells, based on a state of controlling the conduction/non-conduction, and at least one of a voltage at the node between the cells detected by said voltage detector, a voltage of the high voltage side or the low voltage side of the power line, and a terminal voltage of each cell,
wherein:
said voltage detector includes:
an analog/digital converter which measures a voltage of the node between cells, and
an input switching section capable of selectively connecting the node between the cells to the analog/digital converter,
wherein the node between the cells is short-circuited by said short-circuiting section after being connected to the analog/digital converter by said input switching section.

4. A battery pack according to claim 3, further comprising:
a cell selector which controls said short-circuit section to short-circuit the node between the cells and the analog/digital converter after connecting said node to the analog/digital converter by said input switching section.

5. A battery pack, comprising:
an assembled battery including a plurality of secondary battery cells connected at least in series
a voltage detector which detects a terminal voltage of each of said plurality of secondary battery cells;
a charge/discharge controller which controls charge/discharge of the assembled battery based on the terminal voltage of each cell detected by the voltage detector;
a short-circuiting section which short-circuits a node between cells to the high voltage side or the low voltage side of a power line, or which short-circuits nodes between the cells to each other; and
a disconnection detector which controls conduction/non-conduction of said short-circuiting section and which detects a disconnection of the connection line from the voltage detector to the node between the cells, based on a state of controlling the conduction/non-conduction, and at least one of a voltage at the node between the cells detected by said voltage detector, a voltage of the high voltage side or the low voltage side of the power line, and a terminal voltage of each cell, wherein the charge/discharge controller:

performs a protection operation upon detecting an abnormality by comparing a result of detection by said voltage detector with a predetermined threshold value, and further includes a double protection IC, which detects a terminal voltage of each cell by said voltage detector, and which performs a protection operation upon detecting an abnormality by comparing a voltage detected by said voltage detector with a threshold voltage set to or above that of the charge/discharge controller.

6. A method for detecting a disconnection of a battery pack comprising an assembled battery including a plurality of secondary battery cells connected at least in series, comprising the steps of:

short-circuiting a node between cells to a high-voltage side or a low-voltage side of a power line, or short-circuiting the node between the cells to each other;

connecting selectively the node between the cells to an analog/digital converter which measures a voltage of the node between cells; and detecting a disconnection of the connection line to the node between the cells, based on a short-circuit state in said short-circuiting step, and at least one of a voltage at the node between the cells after being short-circuited by said short-circuiting step, a voltage of the high voltage side or the low voltage side of the power line, and a terminal voltage of each cell, wherein the node between the cells is short-circuited by said short-circuiting step after being connected to the analog/digital converter by said connecting step.

* * * * *